(12) United States Patent
LeCoq

(10) Patent No.: US 8,109,234 B1
(45) Date of Patent: Feb. 7, 2012

(54) COLLAPSIBLE PET BOWL

(75) Inventor: John Land LeCoq, Silverthorne, CO (US)

(73) Assignee: fishpond LLC, Silverthorne, CO (US)

( * ) Notice: Subject to any disclaimer, the term of this patent is extended or adjusted under 35 U.S.C. 154(b) by 173 days.

(21) Appl. No.: 11/894,985

(22) Filed: Aug. 22, 2007

Related U.S. Application Data

(60) Provisional application No. 60/839,237, filed on Aug. 22, 2006.

(51) Int. Cl.
*A01K 5/01* (2006.01)

(52) U.S. Cl. .................. 119/61.56; 119/61.5

(58) Field of Classification Search ............ 119/61.5, 119/61.54, 61.55, 61.56; 220/9.1, 9.4, 62.11–62.13, 220/62.21, 666
See application file for complete search history.

(56) References Cited

U.S. PATENT DOCUMENTS

| | | | | |
|---|---|---|---|---|
| 216,227 A * | 6/1879 | Sedgwick | ............. | 220/9.2 |
| 1,691,904 A * | 11/1928 | Gamble | ............. | 206/8 |
| 2,575,893 A * | 11/1951 | Seaman | ............. | 383/25 |
| 2,792,043 A * | 5/1957 | McLean | ............. | 150/118 |
| 4,124,049 A * | 11/1978 | Yamaguchi | ............. | 220/216 |
| 4,383,564 A * | 5/1983 | Hoie | ............. | 383/66 |
| 4,762,087 A * | 8/1988 | Henecke | ............. | 119/61.56 |
| D299,768 S | 2/1989 | Windom | | |
| D330,785 S | 11/1992 | Jordan | | |
| 5,209,184 A | 5/1993 | Sharkan et al. | | |
| 5,429,437 A * | 7/1995 | Shaw et al. | ............. | 383/33 |
| 5,743,210 A | 4/1998 | Lampe | | |
| 5,809,935 A | 9/1998 | Kolterman et al. | | |
| 6,019,244 A * | 2/2000 | Jones | ............. | 220/666 |
| D438,348 S | 2/2001 | Grady et al. | | |
| D466,655 S | 12/2002 | Zelinger | | |
| 6,520,825 B1 * | 2/2003 | Herr | ............. | 446/71 |
| 7,080,750 B2 * | 7/2006 | Wein et al. | ............. | 220/495.01 |

* cited by examiner

*Primary Examiner* — Rob Swiatek
*Assistant Examiner* — Ebony Evans
(74) *Attorney, Agent, or Firm* — Reinhart Boerner Van Deuren s.c.

(57) ABSTRACT

A collapsible bowl apparatus and related methods of use.

19 Claims, 6 Drawing Sheets

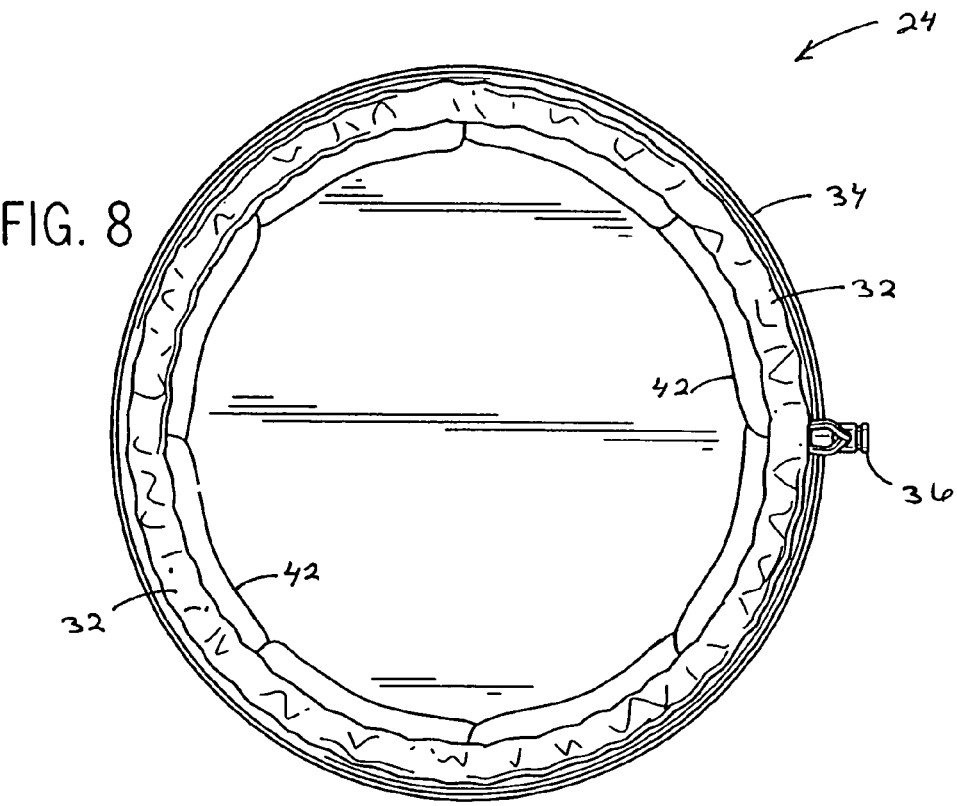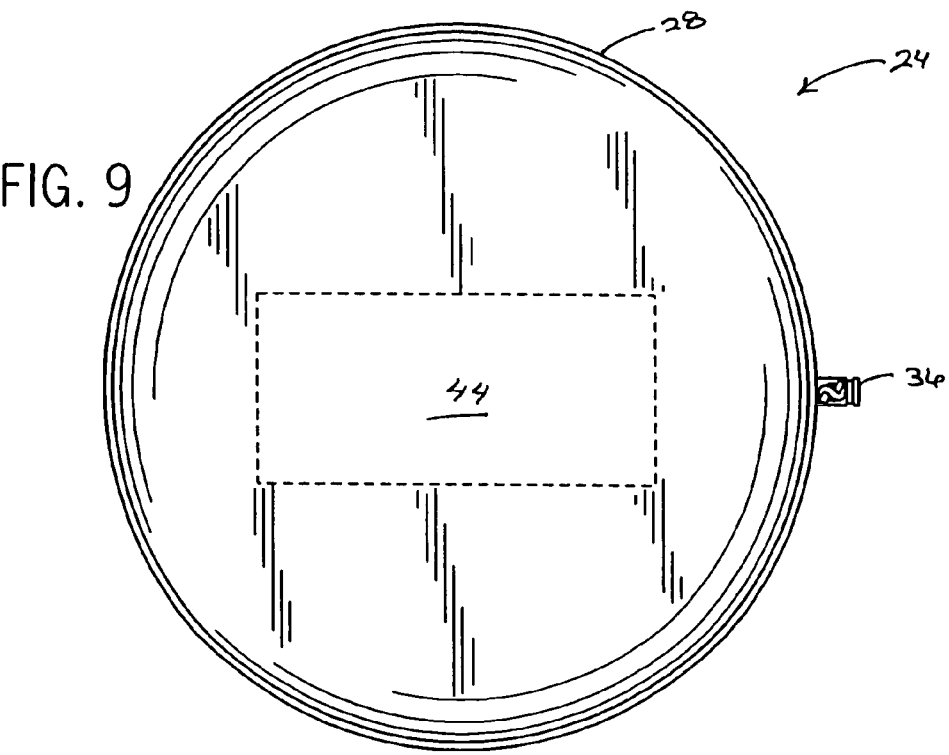

COLLAPSIBLE PET BOWL

This application claims priority benefit from provisional application Ser. No. 60/839,237 filed on Aug. 22, 2006, the entirety of which is incorporated herein by reference.

BACKGROUND OF THE INVENTION

Pets are often considered family members. Some attain status at least comparable to—and perhaps more permanent than—significant others. Increasingly, pets of all species and varieties travel with and accompany their owners during travel, on vacation, to and from destinations away from home. Comfort can be maintained by providing a familiar food and/or water bowl. While such containers in a home environment are typically of rigid construction, dimensional aspects can hinder transport—especially so for hiking, backpacking and other outdoor endeavors.

A number of travel-related pet bowls are currently available, most of which can be characterized as having deformable or foldable side and bottom portions. Variable surface and volume dimensions, upon folding or deformation, can facilitate compact transport. However, such articles are not without problems and deficiencies. For instance, the same foldability/deformability which favors packing can also introduce varying degrees of structural and positional instability. As evidenced by the amount of spillage, an impatient pet can often leave food and water delivery less than effective.

SUMMARY OF THE INVENTION

In light of the foregoing, it is an object of the present invention to provide one or more collapsible pet bowl articles and/or methods for their inter-relational storage and/or transport, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

In part, it can be an object of the present invention to provide a collapsible bowl with structural and positional stability, for use during pet meals and for transport purposes, or as may be employed in various other functional contexts, whether for human or animal use.

It can also be an object of the present invention to provide a collapsible pet bowl, extending use to the storage and/or transport of other containers, apparatus and/or pet care items, for added convenience and spatial economy for storage or during travel or sporting activities.

Other objects, features, benefits and advantages of the present invention will be apparent from this summary, the following descriptions of certain embodiments, and will be readily apparent to those skilled in the art having knowledge of various pet bowl articles, component configurations and storage/transport techniques. Such objects, features, benefits and advantages will be apparent from the above as taken into conjunction with the accompanying examples, figures and all reasonable inferences to be drawn therefrom, alone or with consideration of the references incorporated herein.

In part, the present invention can be directed to a travel pet bowl or another bowl apparatus. Such a bowl apparatus canned comprise a rigid bottom component comprising an inner portion; and at least one inwardly collapsible sidewall component comprising an inner portion, such a sidewall component as can be coupled to a bottom component, and as can comprise a water-resistant component coupled thereto. In certain embodiments, such a sidewall component can be water-resistant by way of one or more chemical or material treatments known in the art. In certain other embodiments, such a water-resistant component can comprise a liner component coupled to such a sidewall component, and as can be positioned along the inner portion of such a sidewall component and along the inner portion of a bottom component. Such a liner component can be coupled to an upward portion of such a sidewall component. Regardless, a bottom component can be coupled to one sidewall component, such an arrangement as can provide a bowl apparatus comprising a rounded peripheral configuration. In certain such embodiments, a rigid bottom component can extend upwardly along the sidewall component to provide added stability during use and storage applications.

In part, the present invention can also be directed to a pet bowl apparatus comprising a rigid bottom component comprising an inner portion; at least one collapsible sidewall component comprising an inner portion, such a sidewall component as can be coupled to a bottom component; and a sheath component extending from such a sidewall component. In certain embodiments, such a sidewall component can comprise a water-resistant component comprising a liner component coupled to such a sidewall component, as can be positioned along the inner portion of a sidewall component and along an inner portion of a bottom component. In certain embodiments, such a bottom component can be coupled to one sidewall component, providing bottom and sidewall components arranged to comprise a rounded, peripheral configuration.

Without limitation, in certain embodiments, a sheath component can comprise a drawstring positioned therein or therewith. In certain such embodiments, such a drawstring can be positioned within a peripheral loop figured with such a sheath component. As discussed below and illustrated elsewhere herein, another apparatus can be positioned within such a pet bowl apparatus, with sidewall and sheath components collapsed over the other apparatus. In certain such embodiments, the other apparatus can comprise a second bowl configured for and nesting within the pet bowl apparatus. Likewise, as illustrated below, the sheath and sidewall components can be collapsed about a second bowl. With use of an optional drawstring, the sheath component can be cinched over and/or about the second bowl.

Accordingly, in part, this invention can also be directed to a method of using a travel pet bowl or another bowl of this invention for storage. Such a method can comprise providing a pet bowl of the sort described above, such a bowl apparatus comprising a sheath component; positioning another apparatus within the pet bowl apparatus; and collapsing a sidewall and a sheath component over the other apparatus. In certain embodiments, the bottom component of such a pet bowl apparatus can be coupled to one sidewall, providing an arrangement of bottom and sidewall components comprising a rounded peripheral configuration. As illustrated below, the other apparatus can compromise a second bowl configured for and nesting within the pet bowl apparatus. In certain such embodiments, with a sheath component comprising a peripheral drawstring, collapsed sidewall and cinched sheath components can facilitate storage and/or transport of a second bowl or another apparatus within the pet bowl apparatus.

BRIEF DESCRIPTION OF THE DRAWINGS

FIG. 8 is a top plan view of a bowl apparatus of the sort illustrated in FIG. 5.

FIG. 9 is a bottom plan view of a bowl apparatus of the sort illustrated in FIG. 5.

DETAILED DESCRIPTION OF CERTAIN EMBODIMENTS

Figure 1:
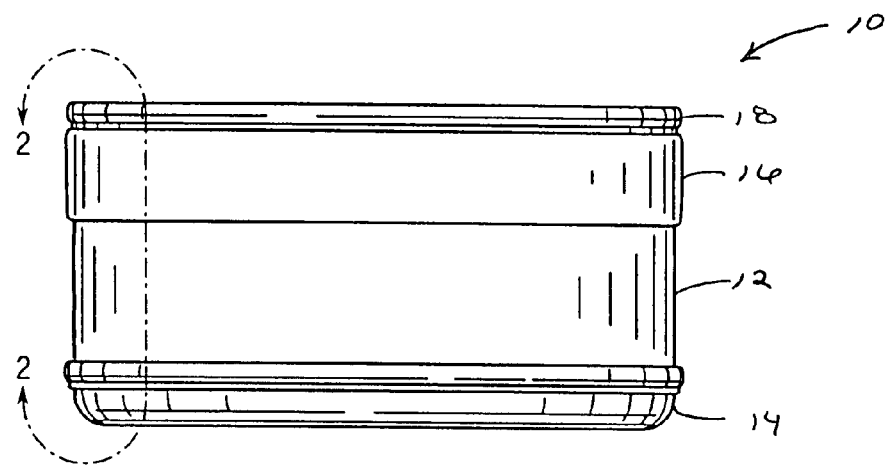
FIG. 1 is an elevational view of a bowl apparatus, in accordance with this invention.

Various non-limiting features and aspects of the present invention can be illustrated with reference to FIGS. 1-11. Referring to FIG. 1, bowl 10 is configured with collapsible and/or deformable sidewall component 12 coupled to rigid bottom component 14. Component 12 can, optionally, be configured with band portion 16 variably positioned thereal-ong, to provide additional structural support and/or for position of one or more of a variety of decorative aspects. Regardless, upper edge component 18, optionally of rigid or sturdy construction, can also serve to lend structural support to sidewall component 12.

Figure 2:
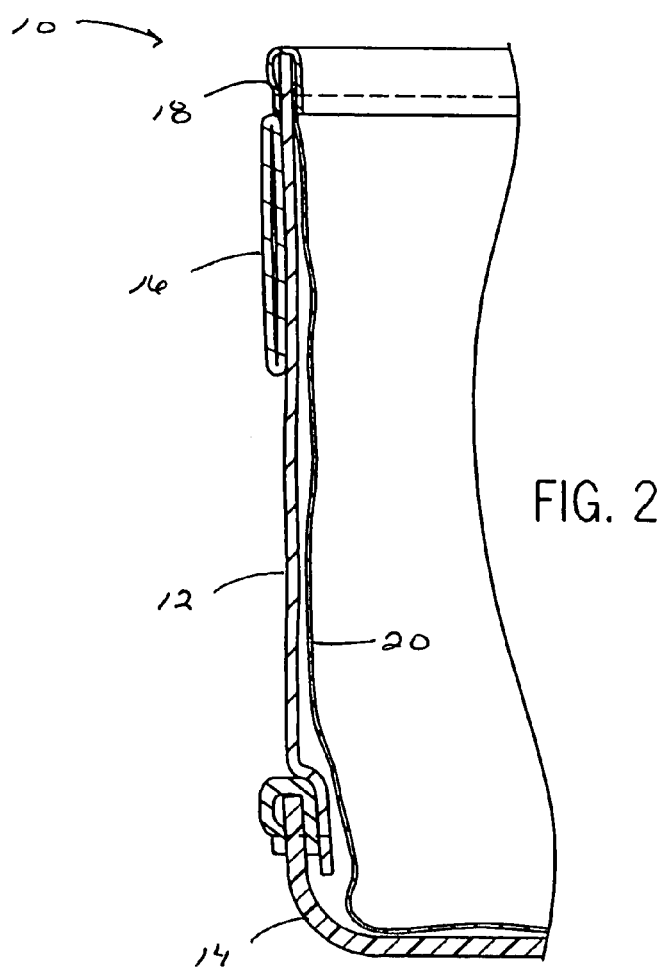
FIG. 2 is a partial, cross-sectional side view of a bowl of FIG. 1, along line 2-2 thereof.
Figure 3:
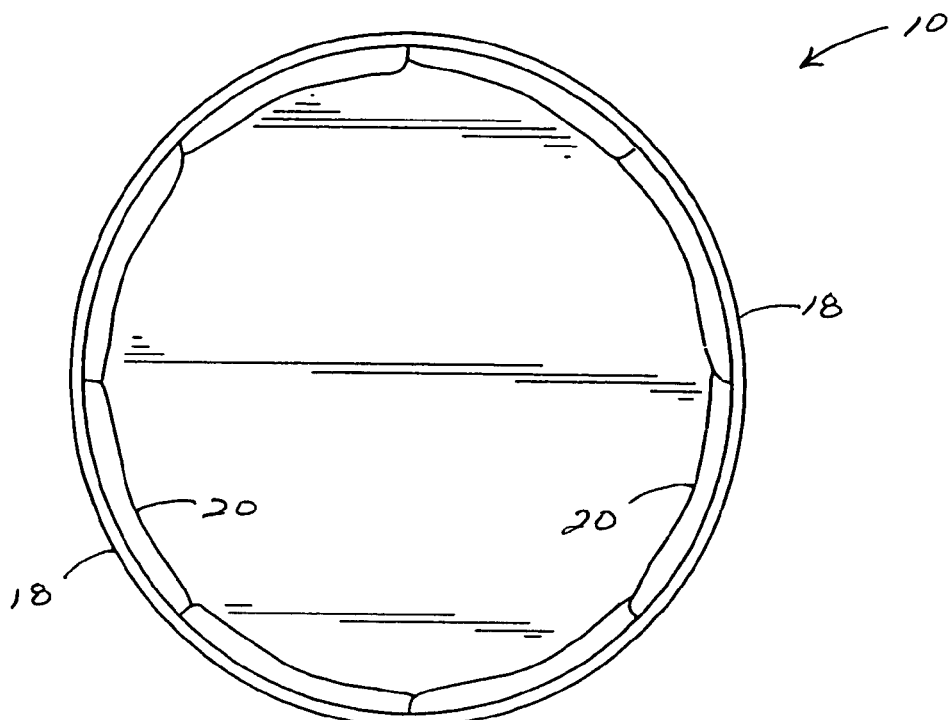
FIG. 3 is a top plan view of a bowl apparatus of the sort illustrated in FIG. 1.
Figure 4:
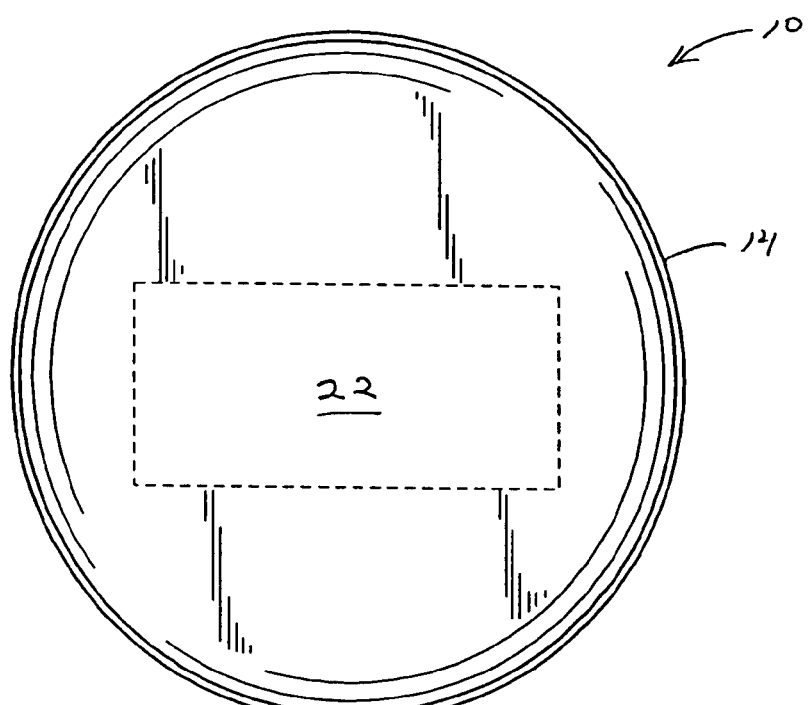
FIG. 4 is a bottom plan view of a bowl apparatus of the sort illustrated in FIG. 1.

A partial, cross-sectional side view of bowl 10 is provided in FIG. 2, along line 2-2 of FIG. 1. Accordingly, FIG. 2 illustrates but one possible construction of bowl 10, showing an inner liner component 20 along sidewall component 12 and bottom portion 14, upwardly coupled to the sidewall and as can be upwardly coupled to or integrated with sidewall component 12 and upper edge component 20. FIGS. 3 and 4, respectively, provide top and bottom views of bowl 10, with FIG. 3 illustrating a peripherally-rounded sidewall 12 and with FIG. 4 illustrating a peripherally-rounded bottom component 14, and optionally providing area 22 for a trademark or another informational designation incorporated therein. Upward extension of bottom portion 14 can provide added structural support to sidewall component 12.

Regardless of any particular article or component configuration, components 12-20 can be constructed of materials known in the art, such materials limited only by the functional attributes of each such described component herein. Without limitation, bottom component 14 can be constructed from a molded polymeric material. Without limitation, desired rigidity and/or non-skid texture can be provided through use of a polyethylene laminate, such a material as can be prepared using known compression molding techniques. Likewise, without limitation, inner component 20 can comprise one or more ply or layer components, constructed from a waterproof material or composite. In certain embodiments, a urethane-coated nylon material can be used with good effect.

Figure 5:
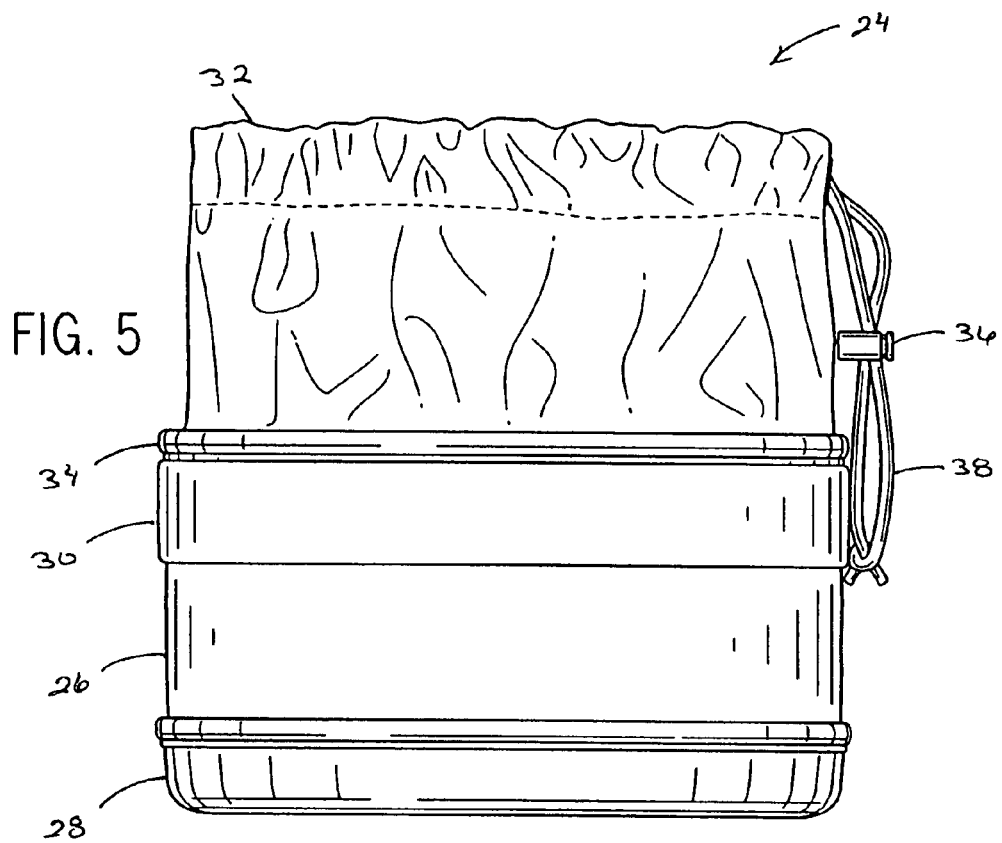
FIG. 5 is an elevational view of another pet bowl apparatus, in accordance with this invention.

Other representative embodiments of this invention can be illustrated with reference to FIG. 5. As shown therein, bowl 24 is configured with collapsible sidewall component 26 coupled to rigid bottom component 28. As discussed above, band portion 30 can be positioned along sidewall component 26. Integrated sheath component 32 is coupled to and extends from upper edge component 34 and can be closed or cinched upon action of mechanism 36 on drawstring or cord 38 positioned therein.

Figure 6:
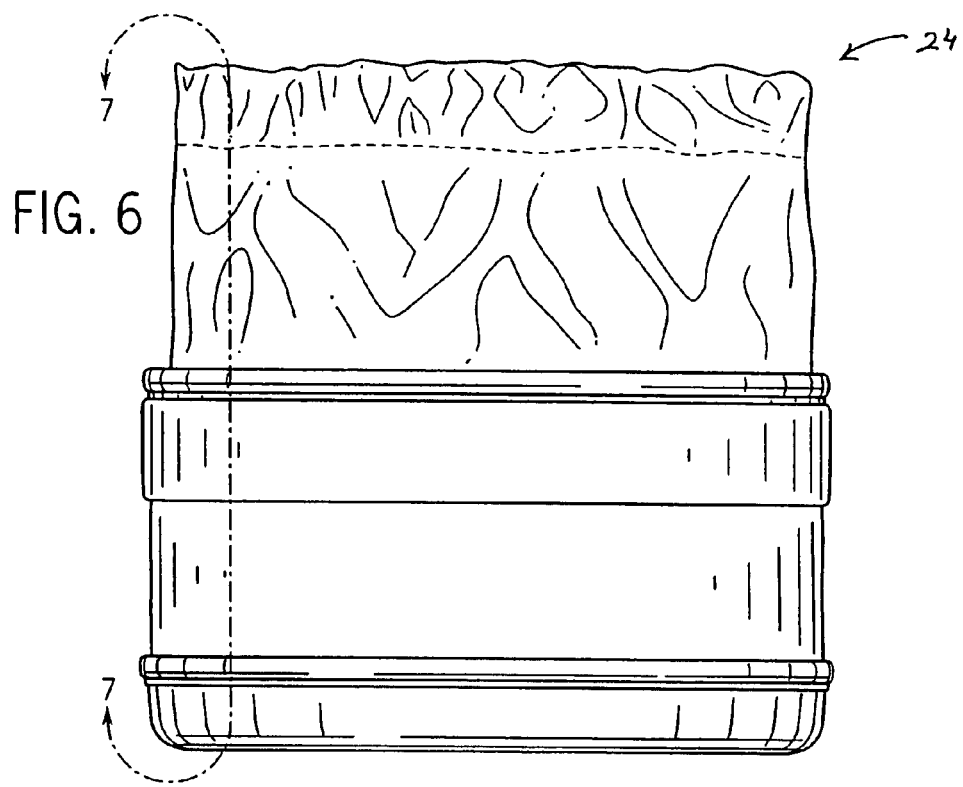
FIG. 6 is a front elevational view of a bowl apparatus of the sort illustrated in FIG. 5.
Figure 7:
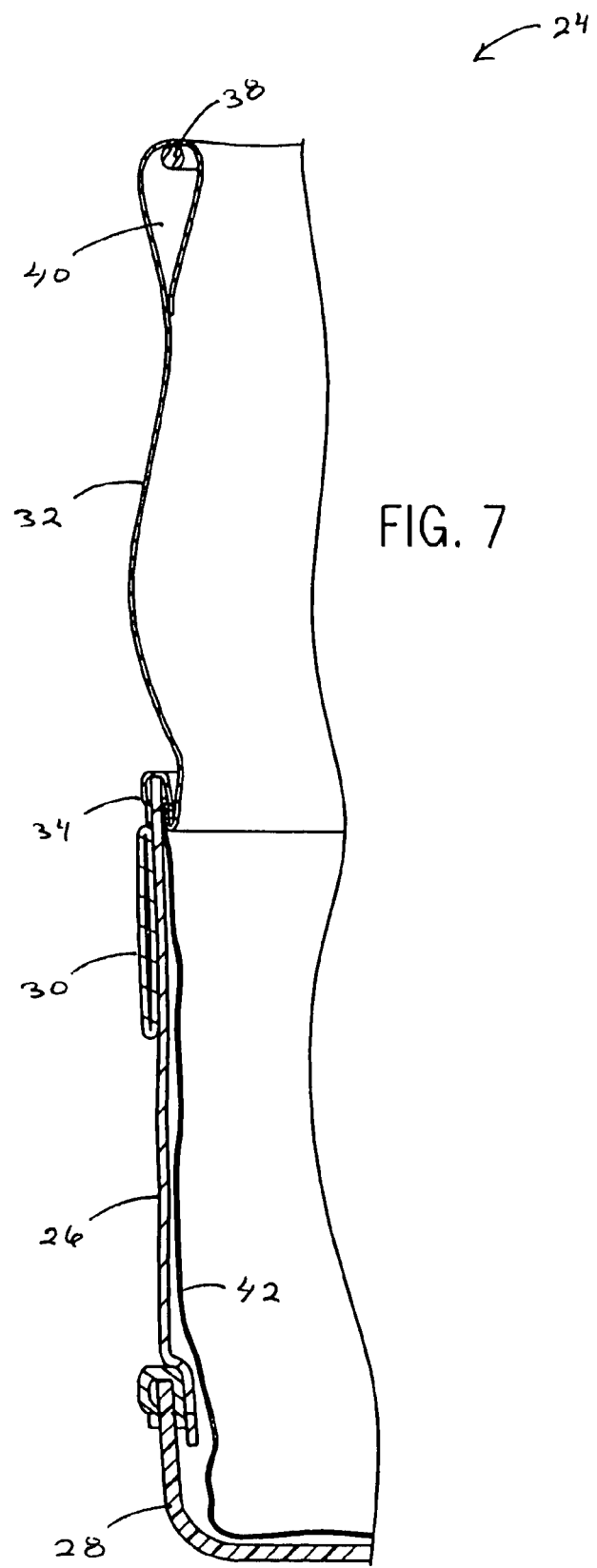
FIG. 7 is a partial, cross-sectional view of the bowl of FIG. 6, along line 7-7 thereof.

FIG. 7 provides a partial cross-sectional view of the bowl of FIG. 6, along line 7-7. As shown therein, drawstring/cord 38 is positioned within circumferential or peripheral loop 40 fashioned by sheath component 32. Inner liner component 42 can be positioned along sidewall component 26 and bottom component 28. Both sheath component 32 and liner component 42 can be coupled to or integrated with upper edge component 34. Various other component constructions and arrangements are possible.

FIGS. 8 and 9 show, respectively, top and bottom views of bowl 24. In particular, bottom component 28 can, optionally, provide for inclusion of a trademark designation and/or other information in area 44. Material choices for components 26, 28, 30 and 34 can be as described above. Sheath component 32 can comprise a pliable (e.g., nylon) material, with properties of the sort affording function as described below.

Figure 10:
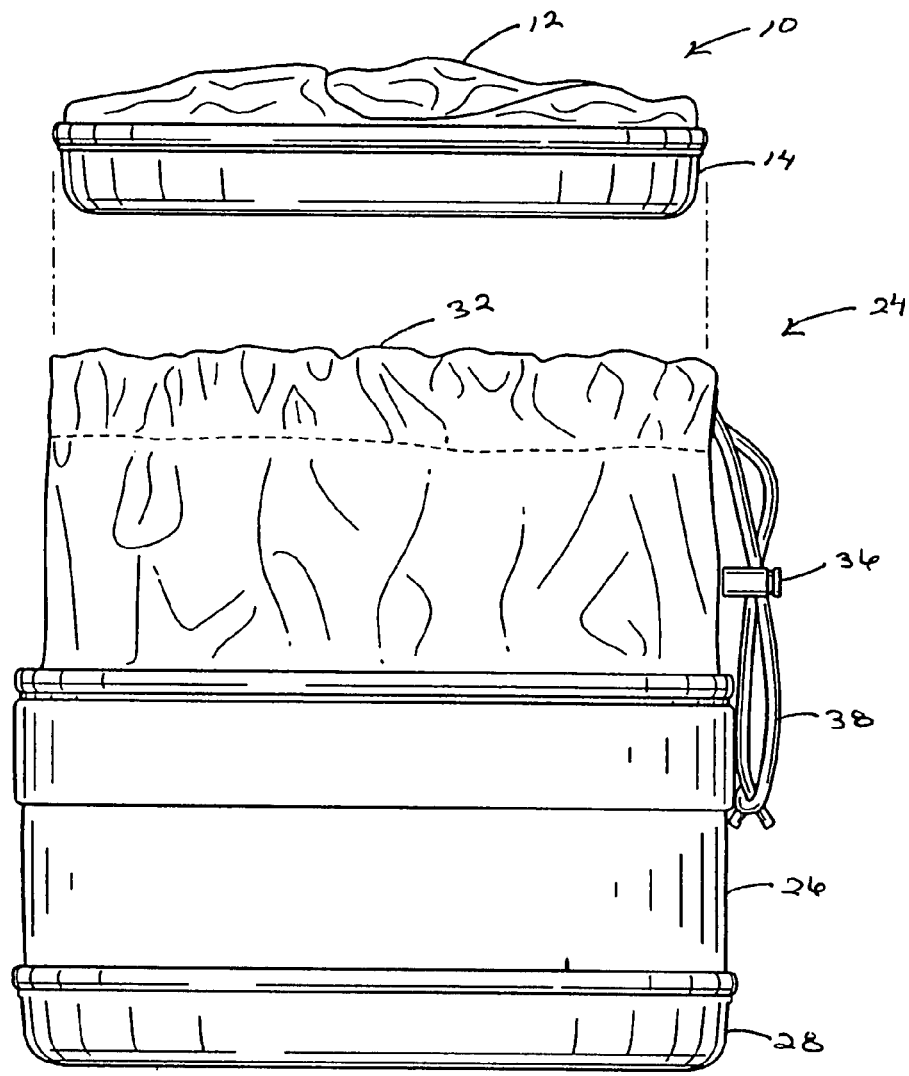
FIG. 10 is an elevational view of a bowl apparatus, in accordance with this invention, illustrating placement of another bowl apparatus therein.
Figure 11:
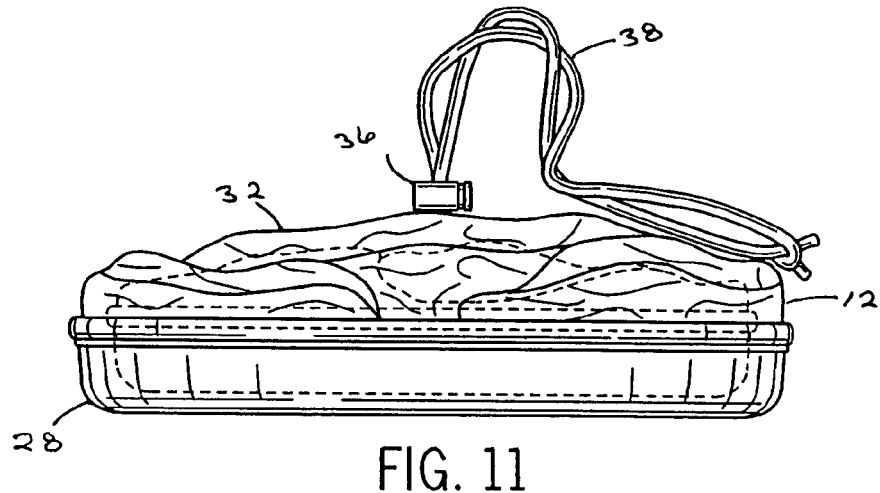
FIG. 11 is an elevational view of the bowl apparatus of FIG. 10 position 1 within the other, in accordance with this invention.

With reference to FIGS. 10 and 11, bowl 10—with collapsed sidewall component 12—can be dimensioned to be positioned through open sheath component 32 of bowl 24. With bottom component 14 of bowl 10, or another apparatus or travel component suitably configured, within bottom component 28 of bowl 24, mechanism 36 can be moved along cord 38 to cinch sheath component 32. With convenient collapse of sidewall component 26, bowl 10 can be configured for nesting with bowl 24, for convenient storage and/or transport. In certain embodiments, bowl 10 can be a pet water bowl, and bowl 24 can be a pet food bowl. As shown in FIG. 11, a nesting relationship of bowl 10 within bowl 24 can provide a compact arrangement for pet care and feeding away from home. Various embodiments of this invention are available from fishpond, LLC of Silverthorne, Colo.

While the principles of this invention have been described in connection with specific embodiments, it should be understood clearly that these descriptions are added only by way of example and are not intended to limit, in any way, the scope of this invention. For instance, the present invention contemplates various other bowl shapes and/or geometric configurations, such shapes, as well as other component proportions, configurations and proportions, as well as end-use applications, such shapes, configurations and uses limited only by function and utility of the sort described herein.

I claim:

1. A travel pet bowl apparatus, said bowl comprising a rigid bottom component comprising an inner portion; and at least one inwardly collapsible sidewall component comprising an inner portion, said at least one sidewall component coupled to said bottom component, said at least one sidewall component comprising a water-resistant component coupled thereto, wherein said water-resistant component comprises a liner component coupled to said at least one sidewall component and positioned along said inner portion of said at least one sidewall component and along said inner portion of said bottom component, said bottom component rigid during use, storage and transport, said bowl absent a rigid top component and absent a cover component coupled to said at least one sidewall component.

2. The pet bowl apparatus of claim 1 wherein said liner component is upwardly coupled to a said sidewall component.

3. The pet bowl apparatus of claim 1 wherein said bottom component is coupled to said at least one sidewall component.

4. The pet bowl apparatus of claim 3 wherein said liner component is upwardly coupled to said sidewall component.

5. The pet bowl apparatus of claim 1 wherein at least a portion of the periphery of said bottom component extends upwardly.

6. The pet bowl apparatus of claim 1 wherein said at least one sidewall component is coupled to a sheath component extending therefrom.

7. The pet bowl apparatus of claim 6 wherein said sheath component comprises a peripheral drawstring positioned therein.

8. A travel pet bowl apparatus, said pet bowl comprising a rigid bottom component comprising an inner portion; at least one collapsible sidewall component comprising an inner portion, said at least one sidewall component coupled to said bottom component; said at least one sidewall component having a portion proximate to said bottom component and a portion distal from said bottom component; and a sheath component coupled to and extending from said inner portion said at least one sidewall component, said sheath component configured to extend beyond said distal portion of said at least one sidewall component, said bottom component rigid during use, storage and transport.

9. The pet bowl apparatus of claim 8 wherein said sheath component comprises a drawstring positioned within a peripheral loop of said sheath component.

10. The pet bowl apparatus of claim 8 wherein said at least one sidewall component comprises a water-resistant component comprising a liner component coupled thereto, said liner component positioned along said at least one sidewall inner portion and along said bottom component inner portion.

11. The pet bowl apparatus of claim 8 wherein said bottom component is coupled to said at least one sidewall component, each said bottom and sidewall components comprising a rounded peripheral configuration.

12. The pet bowl apparatus of claim 8 wherein another apparatus is positioned therewithin, and said sidewall and sheath components are collapsed over said other apparatus.

13. The pet bowl apparatus of claim 12 wherein said other apparatus comprises a second bowl configured for and nesting therewithin.

14. The pet bowl apparatus of claim 13 wherein said sheath component comprises a peripheral drawstring, said sheath component cinched over said second bowl.

15. A method of using a travel pet bowl for storage, said method comprising:
 providing a pet bowl apparatus of claim 8;
 positioning another apparatus within said pet bowl apparatus; and
 collapsing said at least one sidewall component and said sheath component over said other apparatus.

16. The method of claim 15 wherein said bottom component is coupled to said at least one sidewall component, each said bottom component and said at least one sidewall component providing a rounded peripheral configuration.

17. The method of claim 16 wherein said sheath component comprises a peripheral drawstring positioned within a peripheral loop thereof.

18. The method of claim 15 wherein said other apparatus comprises a second bowl configured for and nesting within said pet bowl apparatus.

19. The method of claim 18 wherein said bottom component is coupled to said at least one sidewall component, said sheath component comprises a peripheral drawstring positioned within a peripheral loop thereof, and said sheath component is cinched over said second bowl.

* * * * *